(12) United States Patent
Qian et al.

(10) Patent No.: US 11,464,071 B2
(45) Date of Patent: Oct. 4, 2022

(54) METHOD OF AND DEVICES FOR INQUIRING ADDRESS ANNOUNCE MESSAGES IN A COMMUNICATION NETWORK

(71) Applicant: SIGNIFY HOLDING B.V., Eindhoven (NL)

(72) Inventors: Weibo Qian, Eindhoven (NL); Dunfa Chen, Eindhoven (NL); Hao Que, Eindhoven (NL); Shouzhen Lan, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 190 days.

(21) Appl. No.: 16/982,987

(22) PCT Filed: Mar. 11, 2019

(86) PCT No.: PCT/EP2019/055983
§ 371 (c)(1),
(2) Date: Sep. 21, 2020

(87) PCT Pub. No.: WO2019/179806
PCT Pub. Date: Sep. 26, 2019

(65) Prior Publication Data
US 2021/0022208 A1    Jan. 21, 2021

(30) Foreign Application Priority Data

| Mar. 23, 2018 | (WO) | PCT/CN2018/080220 |
| Aug. 24, 2018 | (WO) | PCT/CN2018/102342 |
| Aug. 28, 2018 | (EP) | 18191254 |

(51) Int. Cl.
*H04W 84/18* (2009.01)
*H04L 1/18* (2006.01)
(Continued)

(52) U.S. Cl.
CPC .......... *H04W 84/18* (2013.01); *H04L 1/1858* (2013.01); *H04W 8/005* (2013.01); *H04W 74/08* (2013.01)

(58) Field of Classification Search
None
See application file for complete search history.

(56) References Cited

U.S. PATENT DOCUMENTS

| 7,600,041 B2 | 10/2009 | Gandar |
| 7,768,954 B2 | 8/2010 | Guthrie |

(Continued)

*Primary Examiner* — Robert M Morlan (57) ABSTRACT

A method of and network devices arranged for inquiring node device address information after commissioning of a network of communicatively interconnected node devices. A gateway device (2) broadcasts an inquiry message ($M_{INQ}$) in the network, requesting each of the node devices (3, 4, 5) to transmit its node device address announce message ($M_{ANN}$), after a time delay ($\Delta_{t1}$; $\Delta_{t2}$) from receiving the inquiry message ($M_{INQ}$). The gateway device (2) transmits an acknowledgement message ($M_{ACK}$) to the node device addressed in a received node device address announce message ($M_{ANN}$), indicating that the respective node device address announce message ($M_{ANN}$) is received by the gateway device (2). A node device (4) may retransmit its node device address announce message ($M_{ANN}$) until receipt of an acknowledgement message ($M_{ACK}$). Received address information is stored by the gateway device (2) for control and communication purposes of the nodes in the network.

14 Claims, 4 Drawing Sheets

(51) Int. Cl.
*H04W 8/00* (2009.01)
*H04W 74/08* (2009.01)

(56) References Cited

U.S. PATENT DOCUMENTS

| | | | |
|---|---|---|---|
| 7,917,663 B2 | 3/2011 | Choi et al. | |
| 7,949,786 B2 | 5/2011 | Ha et al. | |
| 2007/0147334 A1 | 6/2007 | Guthrie | |
| 2007/0288618 A1* | 12/2007 | Yeo | H04W 8/005 709/223 |
| 2009/0135716 A1* | 5/2009 | Veillette | H04L 45/28 370/328 |
| 2009/0290522 A1 | 11/2009 | Zhou | |
| 2013/0231151 A1* | 9/2013 | Kneckt | H04L 69/22 455/515 |
| 2017/0223809 A1 | 8/2017 | Oliver et al. | |

* cited by examiner

METHOD OF AND DEVICES FOR INQUIRING ADDRESS ANNOUNCE MESSAGES IN A COMMUNICATION NETWORK

CROSS-REFERENCE TO PRIOR APPLICATIONS

This application is the U.S. National Phase application under 35 U.S.C. § 371 of International Application No. PCT/EP2019/055983, filed on Mar. 11, 2019, which claims the benefits of European Patent Application No. 18191254.4, filed on Aug. 28, 2018, Chinese Patent Application No. PCT/CN2018/102342, filed on Aug. 24, 2018 and Chinese Patent Application No. PCT/CN2018/080220, filed on Mar. 23, 2018. These applications are hereby incorporated by reference herein.

TECHNICAL FIELD

The present disclosure generally relates to communication and control in a network of communicatively interconnected devices and, in particular, to the inquiry of address announce messages of node devices in a mesh network.

BACKGROUND

Wireless Mesh Networks, WMNs, Wireless Personal Area Networks, WPANs, or in general communication networks comprised of a plurality of communicatively interconnected devices, have to provide deployment flexibility and scalability to support large numbers of communication devices, such as mobile or movable and non-mobile or stationary communication devices. Examples of such communication devices are Customer-Premises Equipment, CPE, for example lighting devices having communication capabilities, Internet of Things, IoT, devices, and User Equipment, UE, for mobile telephone and data communication. In practice, the term network node device or in short node device or node is generic for all such devices.

The network generally comprises multiple network end nodes, network relay nodes, such as bridges, switches and other electric infrastructure devices and equipment, and at least one network control or coordinator device which may provide access to other networks and the Internet, for example. Such a network control or coordinator device is generically called a backend or gateway device.

Network protocols for exchanging data by networked devices or nodes are generally available and known as ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), and KNX (based systems).

In a wireless mesh network, the node devices may communicate in either one of unicast mode and broadcast mode, using the Bluetooth Low Energy, BLE, mesh protocol or the ZigBee protocol, for example. A so-called combo-node device, with both ZigBee and BLE connectivity, may operate as a temporal bridging node between a mobile phone and a ZigBee-based lighting network, for example.

In a ZigBee network, for example, after commissioning of the network, every node broadcasts a device announce packet or message, comprising address information of a respective node, such as its specific network address and/or Media Access Control, MAC, address. The MAC address of a device is a unique identifier assigned to a Network Interface Controller, NIC, of the device for communications at the data link layer of the network.

With the device announce packet, the network gateway device receives address information of a respective node in a network for communication purposes. Especially in large scale networks, the device announce packet can be missed by the network gateway device for noise reasons or due to heavy radio communication load, for example.

If some device address information is not available or accessible to the network gateway device, it is not possible for the gateway device to correctly communicate with and control all the node devices in the network. In such a case, for receiving all the relevant address data from all nodes in the network, at present, the only available solution is to switch-off power of all the node devices and to power-up all the nodes anew, until all device announce packets of all nodes in the network are received by the network gateway device. It will be appreciated that this is a cumbersome and time-consuming process, in particular in that for preventing so-called broadcast storms in the network, all nodes may need to be powered-up one after the other.

U.S. Pat. No. 7,768,954 (B2) describes a communication device arranged to delay the procedure for joining a network by a network device as long as the device detects activity on the network. These devices can be used to prevent broadcast storms in the network when a lot of devices need to power-up simultaneously. However, in case of missing address information, all network nodes still have to be powered up to retransmit their device announce packets.

Accordingly, in practice, there is a need for reliably acquiring node device address information by a gateway device in a network of communicatively interconnected node devices after commissioning of the network and its devices.

SUMMARY

The above mentioned and other objects are achieved, in a first aspect of the present disclosure, by a method of inquiring a node device address announce message from a node device in a network of communicatively interconnected node devices, the network comprising a gateway device and a plurality of node devices, the method comprising the steps of:

receiving, by the node device, an inquiry message broadcasted by the gateway device in the network, the inquiry message requesting each of the node devices to transmit its node device address announce message;

transmitting, by the node device, after a time delay from receiving the inquiry message, the node device address announce message, and receiving, by the node device, an acknowledgement message from the gateway device indicating that the node device address announce message is received at the gateway device.

An advantage of the proposed solution is that the address announce message of a node device is not just once provided after commissioning. Rather, in the present solution, the address announce message is provided by a node device on request and under control of the gateway device. In this way, the risk of not receiving at the gateway crucial address information, like a network address and/or MAC address of a node device, is already significantly reduced.

Especially in large scale networks, it is an intense job to recover missed device address information by repowering all node devices. By reducing or minimizing, in accordance with the proposed solution, the risk of not receiving an address announce message of a particular node device, the risk of having to restart all the node devices is also significantly reduced, which is not only advantageous in terms of reduced costs and reduced downtime of the network, but also improves the overall operation and maintenance reliability of the network, for example.

In the proposed solution a single inquiry message is broadcasted simultaneously for all the node devices in the network, to inform all node devices to transmit their respective node device address announce message. To prevent broadcast storms in the network, a node transmits its node device address announce message after a time delay.

The time delay may be device specific for a respective node device. However, in an embodiment of the present disclosure, the address announce message is transmitted by a node device either after a settable time delay or after a random time delay. The value of the settable time delay may be set by a network operator or administrator, for example, for each node device or a for a cluster of node devices independently, and stored in each node device individually.

Once an acknowledgment message is received by the node device, the node device knows that its node device address announce message is successfully received by the gateway device.

In the absence of an acknowledgement, in accordance with the present disclosure, the step of transmitting the node device address announce message is repeated by the node device with a repetition rate, until receipt of the acknowledgement message. That is, the address announce message is repeatedly provided as long as the node device does not receive an acknowledgement of receipt from the gateway device. When the acknowledgment message is received by the node device, the node device may stop retransmission of the address announce message.

The repetition rate can be a settable repetition rate or a random repetition rate, for each node device or a for a cluster of node devices individually. Its value can be stored in the node itself or can be received with the inquiry message transmitted by the gateway device. To prevent unlimited repetitions of node device address announce messages, a maximum number of repetitions may be set, for example.

To prevent that node devices operate with a too long time delay value, in accordance with the present disclosure, a maximum of the time delay may be received with the inquiry message by a node device.

In this manner, a maximum of the time delay may be imposed on the node devices by the gateway device, dependent on the size and complexity of the network, for example. In particular, in the case of random time delays, this measure provides a limit to the overall time of acquiring address information by the gateway of the network as a whole.

To prevent that a node device too quickly repeats its address announce message, in accordance with an embodiment of the present disclosure, a minimum of the repetition rate is received with the inquiry message by a node device.

In a second aspect of the present disclosure, a method of inquiring a node device address announce message of a node device in a network of communicatively interconnected node devices is provided, the network comprising a gateway device and a plurality of node devices, the method comprising the steps of:

broadcasting, by the gateway device, in the network, an inquiry message, the inquiry message requesting each of the node devices to transmit its node device address announce message;

receiving, by the gateway device, the node device address announce message of a node device;

transmitting, by the gateway device, an acknowledgement message to the node device addressed in the received node device address announce message, and storing, by the gateway device, node device address information of the received node device address announce message.

In accordance with the present disclosure, receipt of a node device address announce message is positively acknowledged in that the gateway device transmits an acknowledgement message to the node device addressed in the received node device address announce message. As disclosed in the first aspect above, a node device may retransmit its address announce message until receipt thereof is acknowledged by the gateway device. All node addresses that are confirmed or acknowledged are stored by the gateway device, such that the gateway device can correctly control all the devices in the network.

The inquiry message is broadcasted after commissioning of the network. That is, the inquiry message may be directly broadcasted after completion of the commissioning or after a settable time interval after ending commissioning.

Broadcasting of the inquiry message may furthermore start a timer or time interval within which the address inquiry operation has to be completed. The inquiry message may comprise a maximum time delay for a device node to respond to the inquiry message, which maximum time delay may be derived from the above-mentioned time interval in which the address inquiry operation has to be completed. Further, the inquiry message may comprise a minimum repetition rate at which a device node may repeat the transmission of its address announce message. This, to avoid overloading of the network and the gateway device by too fast retransmissions of address announce message by the node devices.

In a third aspect of the present disclosure there is provided a node device arranged for inquiring a node device address announce message in a network of communicatively interconnected node devices, the network comprising a gateway device and a plurality of node devices, the node device comprising a transceiver and a controller for controlling the transceiver and providing data processing in the node device, wherein the transceiver and controller are arranged for:

receiving, by the transceiver, of an inquiry message broadcasted by the gateway device in the network, the inquiry message requesting each of the node devices to transmit its node device address announce message;

transmitting, by the transceiver, after a time delay from receiving the inquiry message, the node device address announce message, and receiving, by the transceiver, an acknowledgement message from the gateway device indicating that the node device address announce message is received at the gateway device.

The transceiver and controller of the node device are further arranged for performing the method of the first aspect of the present disclosure.

In a fourth aspect of the present disclosure there is provided a gateway device arranged for inquiring a node device address announce message from a node device in a network of communicatively interconnected node devices, the network comprising at least the gateway device and a plurality of node devices, the gateway device comprising a transceiver and a controller for controlling the transceiver and providing data processing in the gateway device, and a data repository, wherein the transceiver and controller are arranged for:

broadcasting, by the transceiver, in the network, an inquiry message, the inquiry message requesting each of the node devices to transmit its node device address announce message;

receiving, by the transceiver, the node device address announce message of a node device;

transmitting, by the transceiver, an acknowledgement message to the node device addressed in the received node device address announce message, and storing, by the controller, in the data repository, the node device address information of the received node device address announce message.

The transceiver and controller of the gateway device are further arranged for performing the method of the second aspect of the present disclosure.

In a fifth aspect of the present disclosure there is provided a computer readable storage medium comprising computer program code instructions which, when loaded on to one or more processors or computers, causes the one or more processors or computers to perform the method in accordance with the first aspect of the present disclosure.

In a sixth aspect of the present disclosure there is provided a computer readable storage medium comprising computer program code instructions which, when loaded on to one or more processors or computers, causes the one or more processors or computers to perform the method in accordance with the second aspect of the present disclosure.

The computer readable storage medium or computer program product may take the form of a non-transitory medium like a memory stick, data disc, and the like, and/or may be provided as a download signal in a network, for example.

In a seventh aspect of the present disclosure there is a provided an electric or electronic device, such as a lighting device, comprising at least one node device according to the third aspect of the present disclosure.

These and other aspects of the disclosure will be apparent from and elucidated with reference to the embodiments described hereinafter.

DETAILED DESCRIPTION

Figure 1:
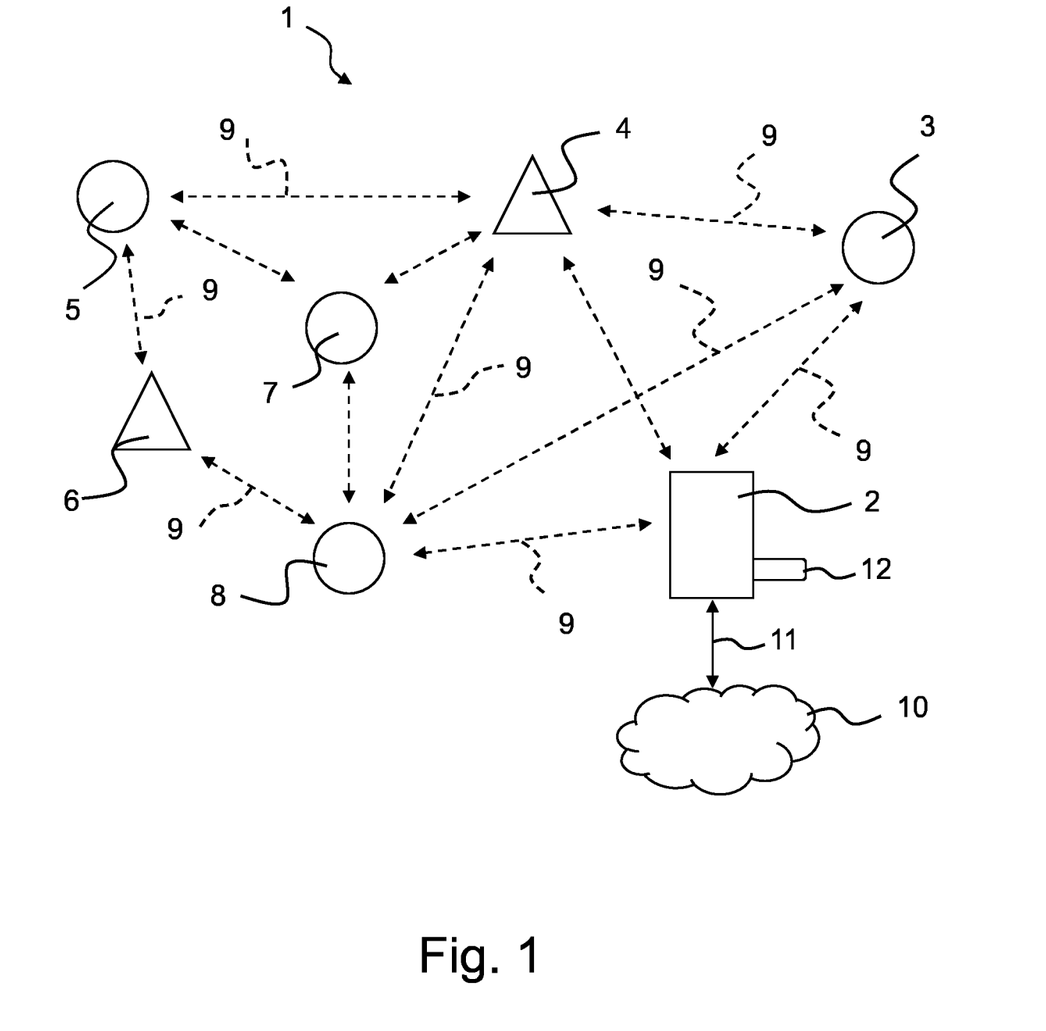
FIG. 1 illustrates, schematically, a network of communicatively interconnected network node devices and a gateway device.

FIG. 1 illustrates, schematically, a network 1 of communicatively interconnected network node devices 3, 4, 5, 6, 7, 8 and a gateway device 2.

By way of example, the network 1 shown in FIG. 1 is configured as a so-called Wireless Mesh Network, WMN, also commonly called Wireless Personal Area Network, WPAN, and is comprised of multiple network end nodes 3, 5, 8 and network relay nodes 4, 6 such as bridges and switches, for example. The nodes 3-8 may form part of electric or electronic networked devices. The wireless communication connections between the network devices 2-8 are indicated by dashed arrows 9. Those skilled in the art will appreciate that in a general network architecture, node devices may also connect by wired communication links (not shown).

The network end nodes 3, 5, 8 are generic for supporting data communication of a large variety of electric or electronic devices, either mobile or movable devices and/or non-mobile or stationary devices. Examples of such devices are lighting devices, in particular lighting devices comprising Light Emitting Diode, LED, lighting modules, equipment for mobile telephony and data communication, Customer Premises Equipment, CPE, Internet of Things, IoT, devices, sensor devices, such as sensors for measuring humidity, temperature, Infra Red, IR, radiation, Carbon Monoxide, Carbon Dioxide, generally designated $CO_x$, actuators, camera systems, alarm systems, etc.

Network relay nodes 4, 6 may bridge a communication distance between neighbouring network end nodes 3, 5 or 5, 8 if such end nodes 3, 5, 8 are not capable of establishing a direct communication connection between these end nodes. It is noted that network relay nodes 4, 6 besides extending the network range, may also support data communication of a same variety of electric or electronic devices as mentioned above in connection with the end nodes 3, 5, 8. Further, an end node and relay node may be comprised in a single physical device. A node device may be mains or battery operated, for example.

The gateway device 2 operates as a network control or coordinator device, which may provide access 11 to other networks, such as the Internet 10, for example. Such a network control or coordinator device is also called a backend or network access device. The gateway device 2 may be deployed in the network 1 or remote of the network 1. For communication purposes, the gateway 2 may comprise integrated transceiver equipment or a so-called communication dongle 12, that may directly connect to a data processing part of the gateway 2, for example by a universal serial bus, USB, port or the like, and comprises communication functionality for exchanging data packets or messages with the network nodes in the network 1.

The network node devices 3-8 may communicate 9 directly with the gateway device 2 or as described above, messages or data packets may be relayed to the gateway device 2 via neighbouring network relay nodes 4 in the mesh network.

The network node devices 3-8 are configured for exchanging data messages or data packets with one or a plurality of the node devices in their neighbourhood, using the same or a different transmission technology. Preferably, the network node devices 3-8 and the gateway 2, or the dongle 12, are configured to operate using a same communication technology or protocol. Non-limited examples of applicable transmission protocols are ZigBee™, Bluetooth™, Thread™, as well as WiFi based protocols and transmission protocols in accordance with a 3GPP standard, and wired bus networks such as DALI™ (Digital Addressable Lighting Interface), DSI (Digital Serial Interface), DMX (Digital Multiplex), and KNX (based systems), wired Ethernet, etc.

Messages that are generated in a network node 3-8, and forwarded to the gateway 2, or the dongle 12, if applicable, are generally referred to as uplink messages or uplink traffic. Messages that are forwarded from the gateway 2 to a network node 3-8 are referred to as downlink messages or downlink traffic. When not explicitly mentioned, the node devices 3-8 are arranged for communicating messages or data packets in the network 1 of the present disclosure in either one or both of a unicast and broadcast transmission mode.

Figure 2:
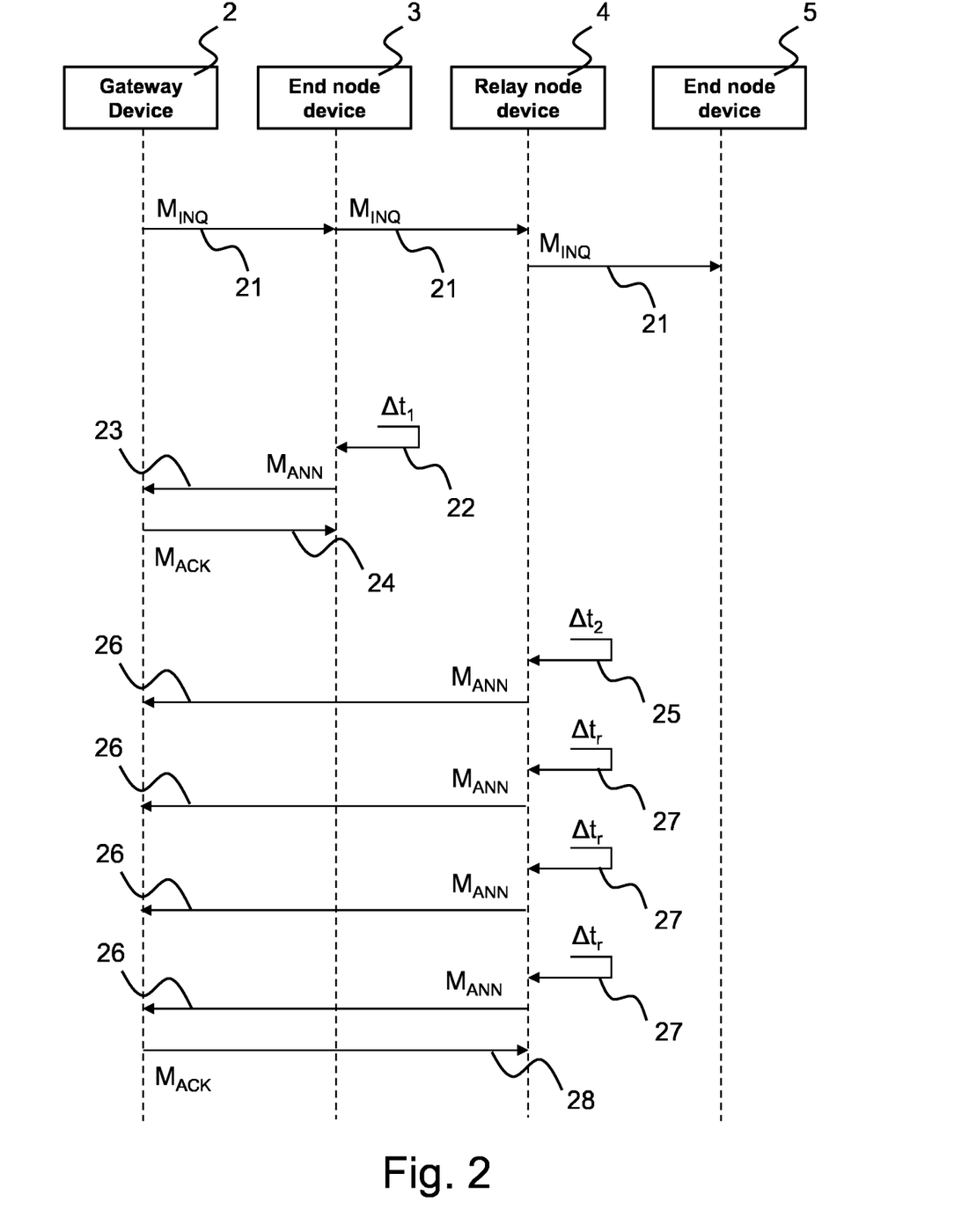
FIG. 2 illustrates, in a sequence diagram, an example of a method of requesting and reporting node device address announce messages in a network of communicatively interconnected network node devices, in accordance with the present disclosure.

FIG. 2 illustrates, in a sequence diagram, an example of a method of inquiring a node device address announce message from a node device in a network of communicatively interconnected network node devices, in accordance with the present disclosure. For clarity reasons, only three node devices 3, 4, 5 are shown in the sequence diagram. In FIG. 2, time is running from the top to the bottom of the sheet (not shown). In this example, after commissioning of the network 1, that is after installation and testing of the node devices and the gateway equipment and communication facilities of the network according to design objectives or specifications, the gateway device 2 broadcasts an inquiry message, $M_{INQ}$, or inquiry data packet 21 in the network 1. The inquiry message 21 is directly received by the end node devices 3 and the relay node device 4, and is indirectly received by the end node device 5 through the network relay node device 4, for example. This inquiry message 21 may be broadcasted after a certain time interval after starting or ending commissioning of the network. For example, the inquiry message 21 may be broadcasted after a time interval of 15 minutes after ending commissioning of the network 1.

Receipt of the inquire message 21 commands or causes the node devices 3-8 to announce their address information. The gateway device 2 may need to know any or both of the specific network address and/or Media Access Control, MAC, address of all node devices in the network in order to correctly control and communicate with these node devices.

After a time delay, $\Delta t_1$, 22 from receiving the inquiry message 21, node device 3 transmits, i.e. in a broadcast or unicast transmission mode, its node device address announce message, $M_{ANN}$, or address announce data packet 23 in the network 1 for receipt by the gateway device 2. The node device address announce message 23 comprises address information of the node device 3 in the network 1 for communication and control purposes, such a specific or short network address and/or MAC address allocated to the respective node device 3.

After a time delay, $\Delta t_2$, 25 from receiving the inquiry message 21, node device 4 transmits, i.e. in a broadcast or unicast transmission mode, its node device address announce message, $M_{ANN}$, or address announce data packet 26 in the network 1 for receipt by the gateway device 2. The node device address announce message 26 comprises at least one of the specific or short network address and/or MAC address allocated to the respective node device 4. In this example, it is assumed that $\Delta t_2 > \Delta t_1$.

The time delay may be specific for each node device 3-8. However, to prevent transmission overload or so-called broadcast storms in the network 1, each address announce message $M_{ANN}$ may be transmitted after one of a settable time delay, for example set by a network operator or administrator, or after a random time delay 22, 25, independently for each node device or a for a cluster of node devices. A maximum of this time delay may, for example, be determined by the node device itself, or is comprised in the inquiry message 21, as a special attribute, for example. This, to achieve that the address inquiry process will be completed within a certain time period.

After receipt at the gateway 2 of the node device address announce message 23 of the node device 3, an acknowledgement message, $M_{ACK}$, or acknowledgement data packet 24 is transmitted by the gateway device 2 to the node device 3. This acknowledgement or confirmation message 24 may be directed, for example in unicast mode, to the respective network address or MAC address of the node device 3. All received node device address information is stored by the gateway device 2.

After receiving the acknowledgement message 24 from the gateway device 2, the node device 3 knows that its node device address announce message 23 is successfully received at the gateway device 2, and may terminate its registration or announce mode of operation.

Turning to node device 4. If within a certain time period $\Delta t_r$, after transmission of the address announce message 26 no acknowledgement message $M_{ANN}$ of the gateway 2 is received by the node device 4, the node device 4 will retransmit its node device address announce message 26. This retransmission may be repeated with a fixed or settable or random repetition rate or repetition time or time delay, i.e. $\Delta t_r$, independent of previous time delays and independent of other node devices, until an acknowledgment message 28 is received by the node device 4. In the exceptional case, when no acknowledgment message 27 is received after a certain amount of attempts, such as ten attempts, or after a certain time threshold, such as 30-60 minutes, the node device 3 may stop sending its node device address announce message 26. Again, for avoiding transmission overload or broadcast storms in the network 1, a minimum repetition rate or repetition time may be received by a node device as a special attribute of the inquiry message 21, for example.

Although not shown in FIG. 2, the node device 5 will also broadcasts its address announce message into the network 1 after receipt of the inquiry message 21.

In an embodiment of the present disclosure, a so-called Device Announce Re-transmitter Cluster is defined, implementing an interface for a gateway device to request address announce messages or packets of network nodes. The cluster identifier, written in programming language C and hexadecimal notation, is shown in Table 1.

TABLE 1

| Cluster identifier | |
|---|---|
| Identifier | Name |
| 0xFD06 | Device Announce Re-transmitter |

This cluster does not have any dependencies on other clusters and, in this example, does not contain specific attributes. The command identifiers, IDs, that can be received by the cluster are shown in table 2. In this example, a dongle 12 is used connected to the gateway device 2, and the node devices 3-8 are lighting device nodes, and more specific LED lighting nodes. Those skilled in the art will appreciate that in a general network architecture, it is not necessary to use a dongle 12 and all types of node devices can be used, such as mentioned above, for example.

TABLE 2

| ID | Description | M/O |
|---|---|---|
| | Command identifier that can be received by the cluster | |
| 0x00 | ZCL_GET_NODE_DEVICE_ADDRESS_COMMAND_ID | M |
| 0x01 | ZCL_REPORT_NODE_DEVICE_ADDRESS_COMMAND_ID | M |
| 0x02 | ZCL_DONGLE_GET_NODE_DEVICE_ADDRESS_REPLY_ID | M |

The ZCL_GET_NODE_DEVICE_ADDRESS message, $M_{INQ}$, is an inquiry message from the dongle to the node(s) in the network, requesting each node to announce its MAC address back to the dongle by unicast or broadcast. Attributes of the ZCL_GET_NODE_DEVICE_ADDRESS message are shown in Table 3. In Table 3, 'Max random delay to response (seconds)' indicates the maximum random delay time value in seconds before the lighting nodes send a response message. 'Response message Type' indicates the type of lighting node response message, either unicast or broadcast. 'Timeout to Repeat Response' indicates the time out for the lighting node to resend or retransmit a response message.

TABLE 3

Attributes ZCL_GET_NODE_DEVICE_ADDRESS command message

| Octet | 1 | 2 | 3 | 4 |
|---|---|---|---|---|
| Data Type | Uint8 | Uint8 | Uint8 | Uint8 |
| Field Name | Command Id | Max random delay to response (seconds) | Response message Type | Timeout to Repeat Response |
| Value | 0x00 | 0x00-0xFF Default: 0xC8 | 0x00 (Unicast) 0x01 (Broadcast) | 0x00-0xFF Default: 0x3C |

The ZCL_REPORT_NODE_DEVICE_ADDRESS message represents the address announce message, $M_{ANN}$, transmitted by a node device in response to the receipt of the inquiry message, $M_{INQ}$. Attributes of the ZCL_REPORT_NODE_DEVICE_ADDRESS message, $M_{ANN}$, are shown in Table 4.

TABLE 4

Attributes ZCL_REPORT_NODE_DEVICE_ADDRESS message

| Octet | 1 | 2-9 |
|---|---|---|
| Data Type | Uint8 | Address |
| Field Name | Command Id | MAC Address (Little Endian) |
| Value | 0x01 | |

The ZCL_DONGLE_GET_NODE_DEVICE_ADDRESS_REPLY message represents the acknowledgement or confirmation message, $M_{ACK}$, transmitted by the gateway device in response to the receipt of the address announce message of a respective node device. Table 5 shows attributes of the ZCL_DONGLE_GET_NODE_DEVICE_ADDRESS_REPLY message.

TABLE 5

Attributes ZCL_DONGLE_GET_NODE_DEVICE_ADDRESS_REPLY

| Octet | 1 |
|---|---|
| Data Type | Uint8 |
| Field Name | Command Id |
| Value | 0x02 |

Figure 3:
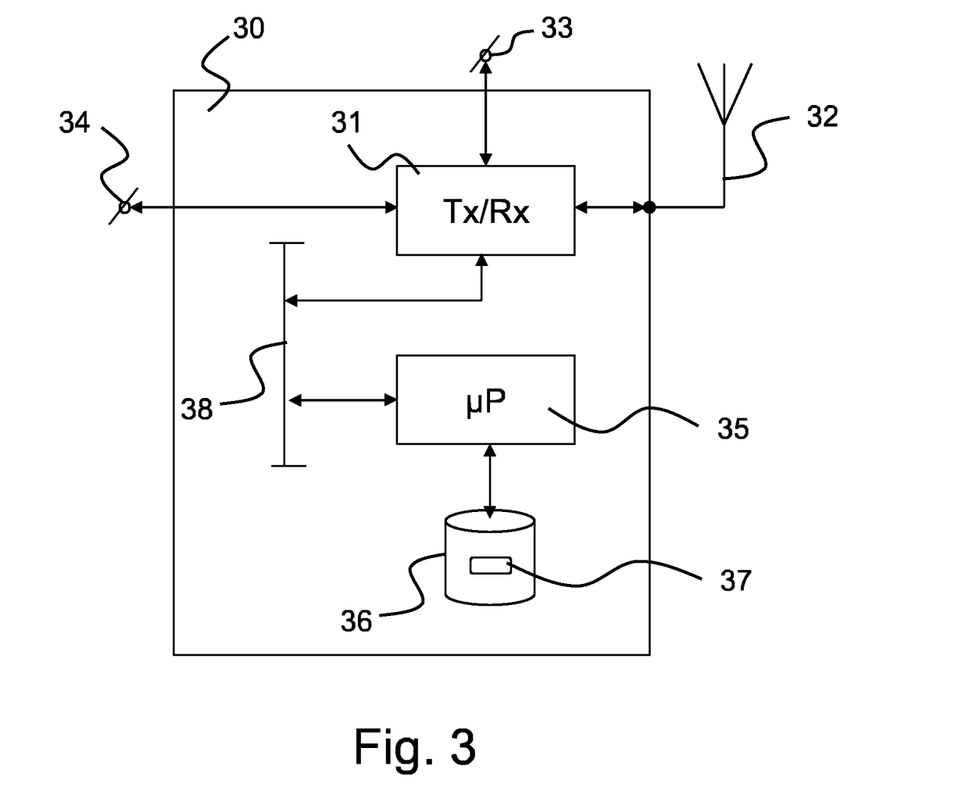
FIG. 3 illustrates, schematically, a circuit diagram of an embodiment of a gateway device in accordance with the present disclosure.

FIG. 3 illustrates, schematically, a circuit diagram of an embodiment of a gateway device 30 in accordance with the present disclosure. The gateway 30 comprises a transceiver, Tx/Rx, module 31 arranged for a wireless 32 or wired 33 exchange of messages or data packets with node devices in a network of communicatively interconnected network node devices. The transceiver 31 may be configured to operate in accordance with any of the data communication technologies and protocols mentioned above with reference to FIG. 1, in one or both of a broadcast and unicast mode of operation. The transceiver 31, or a separate transceiver (not shown) may be arranged 34 for data exchange with other networks, such as the Internet, for example.

The gateway device 30 further comprises at least one data processor or controller 35, and at least one data repository or storage or memory 36, among others for storing computer program code instructions which, when loaded and run on to the one or more processor or controller 35, configure the gateway 30 to operate in accordance with the method of the present disclosure. Address information 37 received from node devices in the network may be stored in the repository 36, or a separate memory or storage accessible to the at least one processor or controller 35. The at least one processor or controller 35 communicatively interacts with and controls the transceiver 31 and the at least one repository or storage 36 via an internal data communication bus 38 of the gateway device 30.

Although not explicitly shown in FIG. 3, a dongle 12 may connect to the bus 38 for performing the address inquiry processing in accordance with the present disclosure.

Figure 4:
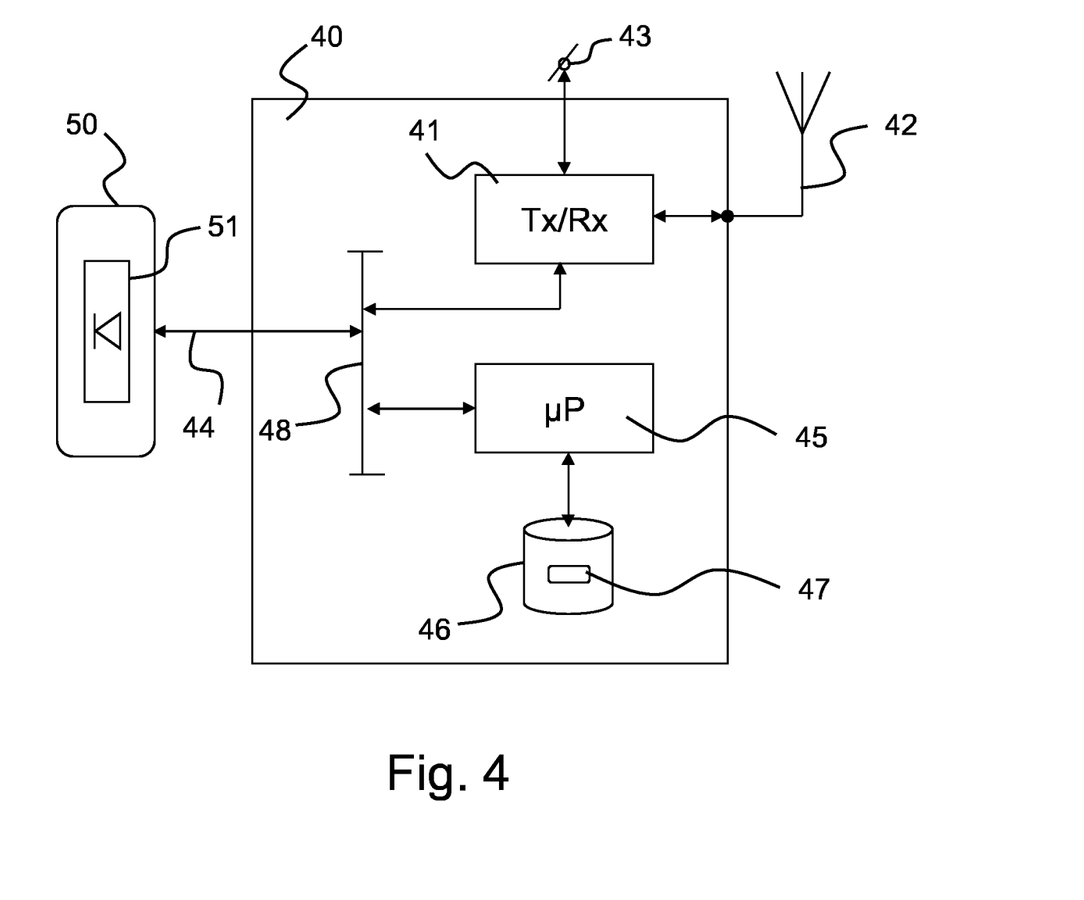
FIG. 4 illustrates, schematically, a circuit diagram of an embodiment of a node device in accordance with the present disclosure.

FIG. 4 illustrates, schematically, a circuit diagram of an embodiment of a node device in accordance with the present disclosure. The node device 40 comprises a transceiver, Tx/Rx, module 41 arranged for a wireless 42 or wired 43 exchange of messages or data packets with a gateway and/or other node devices, inclusive relay node devices, in a network of communicatively interconnected network node devices. The transceiver 41 may be configured to operate in accordance with any of the data communication technologies and protocols mentioned above with reference to FIG. 1, in one or both of a broadcast and unicast mode of operation.

The node device 40 further comprises at least one data processor or controller 45, and at least one data repository or storage or memory 46, among others for storing computer program code instructions which, when loaded and run on to the one or more processor or controller 45, configure the node device 40 to operate in accordance with the present disclosure. Address information 47 of the node device in a network, inclusive its MAC address, may be stored in the repository 46, or a separate memory or storage accessible to the at least one processor or controller 45. The repository or storage 46 further may be arranged for storing device specific or settable time delays, repetition rates and other attributes in accordance with the present disclosure. The at least one processor or controller 45 communicatively interacts with and controls the transceiver 41 and the at least one repository or storage 46 via an internal data communication bus 48 of the gateway device 40.

The node device 40 may be part of or operatively connect 44 to an electric or electronic device, such as lighting device 50, comprising a lighting module 51, preferably a LED lighting module, operation of which may be controlled by the node device 40 from or through a network gateway, or by a remote control device, for example. As mentioned above, instead of or in addition to a lighting device, a node device may control several other electric or electronic devices, operatively connected in a network in accordance with the present disclosure.

Those skilled in the art will appreciate that the solution according to the present disclosure is applicable in a communication network comprising plural node devices and gateway devices, not limited to the number of nodes shown in the example of FIG. 1.

Other variations to the disclosed examples can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. A single processor or transceiver or other unit may fulfill the functions of several items recited in the claims. The mere fact that certain measures are recited in mutually different dependent claims does not indicate that a combination of these measured cannot be used to advantage. A computer program may be stored/distributed on a suitable medium such as an optical storage medium or a solid-state medium supplied together with or as a part of the hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of inquiring a node device address announce message of a node device in a wireless mesh network of communicatively interconnected node devices, said network comprising a gateway device and a plurality of node devices, said method comprising the steps of:
   receiving, by said node device, an inquiry message broadcasted by said gateway device in said network, said inquiry message requesting each of said node devices to transmit its node device address announce message;
   transmitting, by said node device, after a time delay from receiving said inquiry message said node device address announce message;
   receiving, by said node device, an acknowledgement message from said gateway device; indicating that said node device address announce message is received at said gateway device; and
   wherein said step of transmitting by said node device of said node device address announce message is repeated, with a repetition rate, until receiving said acknowledgement message.

2. The method according to claim 1, where each address announce message is transmitted after one of a settable time delay and a random time delay.

3. The method according to claim 1, wherein said repetition rate is one of a settable repetition rate and a random repetition rate.

4. The method according to claim 1, wherein at least one of a maximum time delay and a minimum repetition rate is received with said inquiry message.

5. A method of inquiring a node device address announce message of a node device in a wireless mesh network of communicatively interconnected node devices, said network comprising a gateway device and a plurality of node devices, said method comprising the steps of:
   broadcasting, by said gateway device in said network an inquiry message, said inquiry message requesting each of said node devices to transmit its node device address announce message;
   receiving, by said gateway device said node device address announce message of a node device;
   transmitting, by said gateway device, an acknowledgement message to said node device addressed in said received node device address announce message, and
   storing, by said gateway device node device address information of said received node device address announce message.

6. The method according to claim 5, wherein said inquiry message is broadcasted after commissioning of said network.

7. The method according to claim 6, wherein said inquiry message is broadcasted after a settable time interval after commissioning.

8. A node device arranged for inquiring a node device address announce message in a wireless mesh network of communicatively interconnected node devices, said network comprising a gateway device and a plurality of node devices, said node device comprising a transceiver and a controller for controlling said transceiver and providing data processing in said node device, wherein said transceiver and controller are arranged for:
   receiving, by said transceiver, of an inquiry message broadcasted by said gateway device in said network, said inquiry message requesting each of said node devices to transmit its node device address announce message;

transmitting, by said transceiver, after a time delay from receiving said inquiry message, said node device address announce message, and receiving, by said transceiver, an acknowledgement message) from said gateway device indicating that said node device address announce message is received at said gateway device;

wherein said transceiver repeats transmitting of said node device address announce message with a repetition rate, until receiving said acknowledgement message.

9. The node device according to claim 8, wherein said transceiver and controller are arranged for performing the method of claim 2.

10. A gateway device a arranged for inquiring a node device address announce message from a node device in a wireless mesh network of communicatively interconnected node devices, said network comprising said gateway device and a plurality of node devices, said gateway device comprising a transceiver and a controller for controlling said transceiver and providing data processing in said gateway device, and a data repository, wherein said transceiver and controller are arranged for:

broadcasting, by said transceiver, in said network, an inquiry message, said inquiry message requesting each of said node devices to transmit its node device address announce message;

receiving, by said transceiver, said node device address announce message of a node device;

transmitting, by said transceiver, an acknowledgement message to said node device addressed in said received node device address announce message, and storing, by said controller, in said data repository, node device address information of said received node device address announce message.

11. The gateway device according to claim 10.

12. A computer readable storage medium storing computer program code instructions which, when loaded on to one or more processors, causes said one or more processors to perform the method in accordance with claim 1.

13. A computer readable storage medium storing computer program code instructions which, when loaded on to one or more processors, causes said one or more processors to perform the method in accordance with claim 5.

14. An electric or electronic device, such as a lighting device, comprising at least one node device according to claim 8.

* * * * *